(12) United States Patent
Dropps et al.

(10) Patent No.: US 10,476,810 B1
(45) Date of Patent: Nov. 12, 2019

(54) NETWORK SOURCE ARBITRATION

(71) Applicant: Hewlett Packard Enterprise Development LP, Houston, TX (US)

(72) Inventors: Frank R. Dropps, Eagan, MN (US); Joseph G. Tietz, Tinton Fall, NJ (US)

(73) Assignee: Hewlett Packard Enterprise Development LP, Houston, TX (US)

(*) Notice: Subject to any disclaimer, the term of this patent is extended or adjusted under 35 U.S.C. 154(b) by 12 days.

(21) Appl. No.: 15/963,296

(22) Filed: Apr. 26, 2018

(51) Int. Cl.
*H04L 12/28* (2006.01)
*H04L 12/911* (2013.01)
*H04L 12/937* (2013.01)

(52) U.S. Cl.
CPC ............ *H04L 47/70* (2013.01); *H04L 49/254* (2013.01)

(58) Field of Classification Search
CPC ...... G06F 13/16; G06F 13/1642; G06F 13/36; G06F 13/362; G06F 13/364; G06F 13/40; G06F 13/4022; H04J 3/245; H04L 12/40084; H04L 12/413; H04L 47/50; H04L 47/622; H04L 47/70; H04L 49/254; H04L 2012/5678; H04L 2012/5679; H04W 74/08; H04W 74/0816; H04W 74/0825
See application file for complete search history.

(56) References Cited

U.S. PATENT DOCUMENTS

| | | | |
|---|---|---|---|
| 6,563,818 B1* | 5/2003 | Sang | H04L 12/5601 370/379 |
| 7,099,355 B1 | 8/2006 | Johnson | |
| 7,698,486 B1* | 4/2010 | Chowdhuri | H04L 47/20 710/107 |
| 7,948,896 B2 | 5/2011 | Andersen | |
| 8,705,368 B1* | 4/2014 | Abts | H04L 47/10 370/238 |
| 9,262,356 B2* | 2/2016 | Sonntag | G06F 13/362 |
| 9,535,860 B2* | 1/2017 | Cutter | G06F 13/1663 |
| 9,628,406 B2 | 4/2017 | Morandin et al. | |
| 9,847,949 B1* | 12/2017 | McDonald | H04L 47/39 |
| 2008/0159145 A1 | 7/2008 | Muthukrishnan | |
| 2018/0157604 A1* | 6/2018 | Tietz | G06F 13/1642 |
| 2018/0159789 A1* | 6/2018 | Tietz | H04L 47/527 |
| 2018/0159799 A1* | 6/2018 | Tietz | H04L 49/254 |
| 2018/0159800 A1* | 6/2018 | Tietz | H04L 47/52 |

OTHER PUBLICATIONS

Khan et al, Design of a Round Robin Arbiter on Resource Sharing, International Journal of Electrical, Electronics and Data Communication, ISSN: 2320-2084 vol. 5, Issue-4, 4 pages, Apr. 2017.*
Samman, F. A.; "Network-on-chip with an Arbitration Control for Balancing Throughputs in Multiprocessor Applications," Nov. 26-30, 2014; 5 pages.

* cited by examiner

*Primary Examiner* — Frank Duong
(74) *Attorney, Agent, or Firm* — Hewlett Packard Enterprise Patent Department (57) ABSTRACT

Example implementations relate to arbitrating access to a shared resource for a plurality of data streams. An example implementation includes selecting a data stream from the plurality of data streams according to an arbitration scheme. A data packet of the selected data stream may be granted access to the shared resource. A source count associated with a source of the data packet may be adjusted, and the arbitration scheme may be blocked from selecting the data stream where the source count exceeds a threshold.

20 Claims, 7 Drawing Sheets

NETWORK SOURCE ARBITRATION

BACKGROUND

High-performance computer ("HPC") systems typically include many processors, each with its own local memory. At least some pairs of the processors are interconnected via links, i.e. across a network, to enable each processor to access memory ("non-local memory") of each, or at least some, of the other processors. However, there may be contention for access to a resource, such as the local memory of a node, and a processor of the node may be limited by the amount of data it can process concurrently. An arbitration scheme may be employed to determine which received resource request is to be granted access to the node resource at a given time.

BRIEF DESCRIPTION OF THE DRAWINGS

Certain examples are described in the following detailed description and in reference to the drawings, in which.

DETAILED DESCRIPTION OF SPECIFIC EXAMPLES

An arbitration circuit is provided for use in arbitrating access by a number of data streams to a shared resource managed by a destination arbiter. Each data stream may be associated with a number of source devices competing for the shared resource, and the destination provides balanced or otherwise programmable access to the shared resource according to competing source devices rather than just according to bandwidth, number of queues, or number of data streams.

Sources may compete for a local resource of a node across a network. A network is a communication system in which information can be transmitted between two or more nodes. A node may send and/or receive data across a network. A node in a network can be any type of device that can send and/or receive packets of information, such as, for example, and without limitation, a computer, a computer processor, a computer memory, a client device, a server device, node controller, or a socket, to name but a few. Some networks contain all the same type of nodes (e.g., all the nodes may be computer processors) while other networks contain a mixture of different types of nodes (e.g., some nodes may be computer processors while other nodes may be computer memories). A node may function as a source for sending data, a destination to receive data, and/or a switching system to switch or route data between two or more nodes in a network. Such switching or routing can be performed based on information contained in the network data, such as, for example, a destination address or destination port number.

A node may send and/or receive data in the form of a data stream. A data stream may be a sequence of data, such as any number of data packets transmitted to and/or from a node across a given network path. A packet is a generic name for any unit of information that is processed in a network, switching system, computer, or other system such as for transmitting information or storing information. Unless the context otherwise requires, a packet is not limited to any particular type, format, or protocol. Thus, a packet generally may include, without limitation, a communication protocol message (e.g., a frame, packet, cache line, partial cache line, datagram, user datagram, cell, protocol data unit, inter-processor message, etc.), a data representation (e.g., a block, file, object, etc.), or other unit of information including portions thereof. A data stream may be in the form of a mixed data stream, which may be a sequence of data from two or more sources.

A node may include any number of network ports in the form of ingress ports to receive data, and/or any number of egress ports to send data. A port may be included in a communication interface of a node. Generally speaking, a network interface of a node may include any number of network ports. Ports of one node can be coupled to ports of other nodes, e.g., to establish an internetwork containing multiple switching systems. A port may receive a mixed data stream, such that a single port may receive a sequence of data from multiple sources.

Described herein is an arbitration scheme for balancing access to a resource by source. Specifically, access to a shared resource may be regulated by selecting a data stream among a plurality of data streams according to an arbitration scheme, such as a turn-based arbitration scheme. In an example, the selected data stream may be a mixed data stream including data from multiple data sources. The sources of the data stream may be associated with a set of source counts. When a data packet of the selected data stream is granted access to the shared resource, a source count associated with the source of the data packet may be incremented. A data stream may be blocked from selection by the arbitration scheme where the source count exceeds a threshold.

Figure 1:
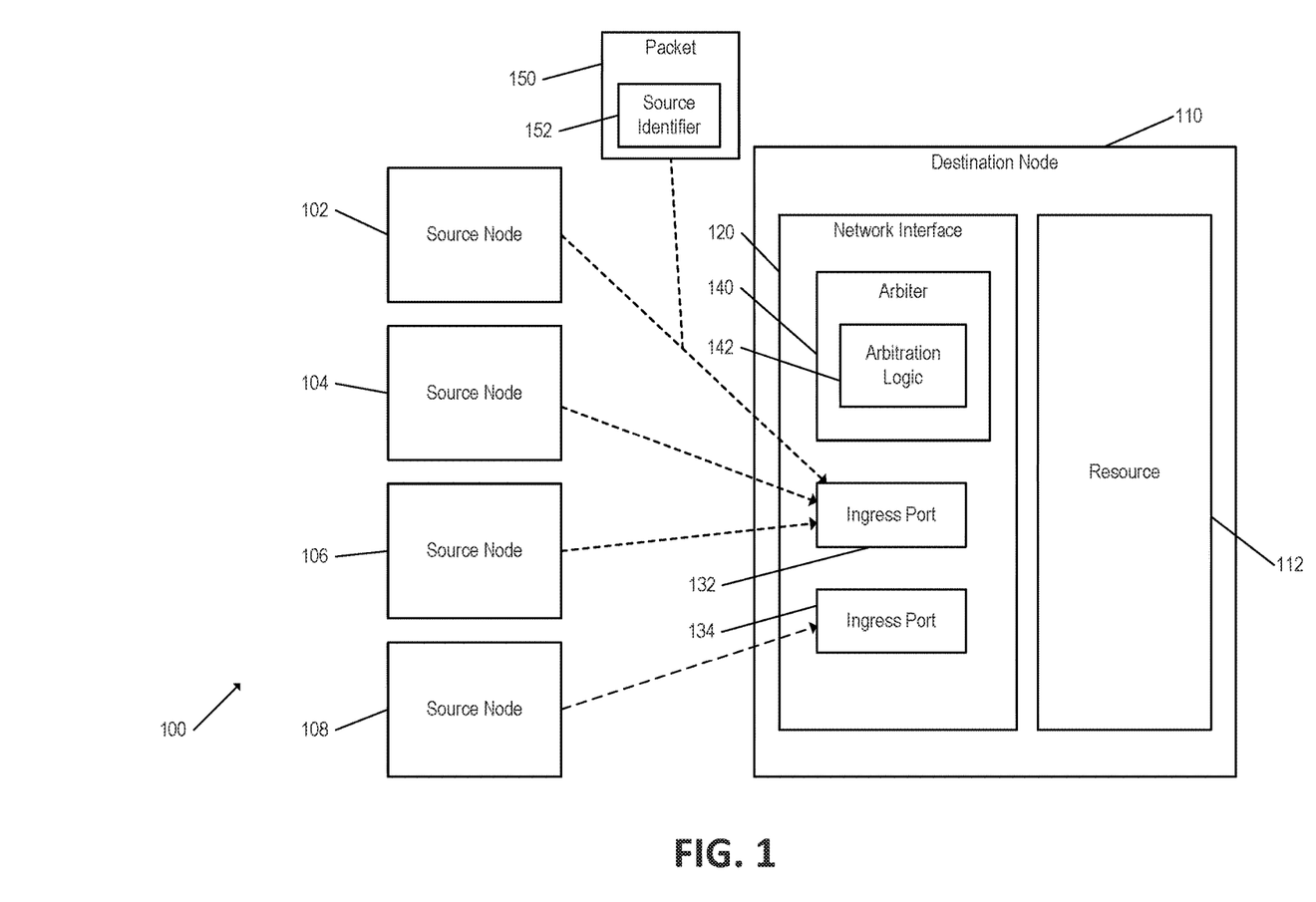
FIG. 1 is a block diagram of an example network system having balanced arbitration between source nodes.

Various examples are now describe with reference to an arbiter for regulating access to a shared resource of any number of nodes. FIG. 1 is a block diagram of an example network system 100 having balanced arbitration between source nodes. FIG. 1 includes example source nodes 102-108 for transmitting data for access to a shared resource e.g. resource 112 of destination node 110. Destination node 110 may receive transmitted data from source nodes 102-108 which may include an access request to resource 112. In this example, resource 112 is illustrated as local to destination node 110, however in other examples destination node 110 may arbitrate access to a remote resource, e.g. where destination node 110 is a switching system to switch and/or route data between any number of source nodes and a node including the remote resource.

Destination node 110 may include a network interface 120 to provide access to a network. Network interface 120 may include a first ingress port 132 and a second ingress port 134 for receiving data from sources 102-108. The data may be received in the form of a data stream of packets. In this example, the network may be preconfigured and/or may otherwise direct the traffic of source nodes 102-106 to ingress port 132, and the traffic of source node 108 to ingress port 134. Thus ingress port 132 may receive a mixed data stream including a sequence of packets from source nodes 102-106 and ingress port 134 may receive a data stream including packets from source node 108. Example packet 150 as illustrated, may include a data field having a source identifier 152 for identifying the source of packet 150. A source identifier may be a source identification number, a tag, a key, an address, a processor core identifier, an application program context identifier (e.g. process identification number), an encryption key identifier, or any other data and/or metadata to identify the source of packet 150. Thus, a packet from a data stream may be traced back to a respective source node from which the packet originated.

Network interface 120 may further include arbiter 140 for regulating access between source nodes 102-108 to resource 112. Arbiter 140 may be implemented as hardware or a combination of hardware and software/firmware. For example, arbiter 140 includes arbitration logic 142, which may be implemented as logical circuitry, processing circuitry (such as central processing units (CPUs), microprocessors, microcontroller devices, digital signal processors (DSPs), etc.) executing machine readable instructions stored in non-transitory machine readable media, application-specific integrated circuits (ASICs), field-programmable gate arrays (FPGAs), application-specific instruction set processors (ASIPs), and/or the like, in any combination of the aforementioned physical structures, some of which may be shared. Furthermore, the logical circuitry and/or processing circuitry of arbiter 140 may be implemented as a single component, or split among multiple components. Although arbiter 140 is illustrated as local to destination node 110, arbiter 140 may be remote to destination 110 and may regulate access to resource 112 remotely across the network.

Figure 2:
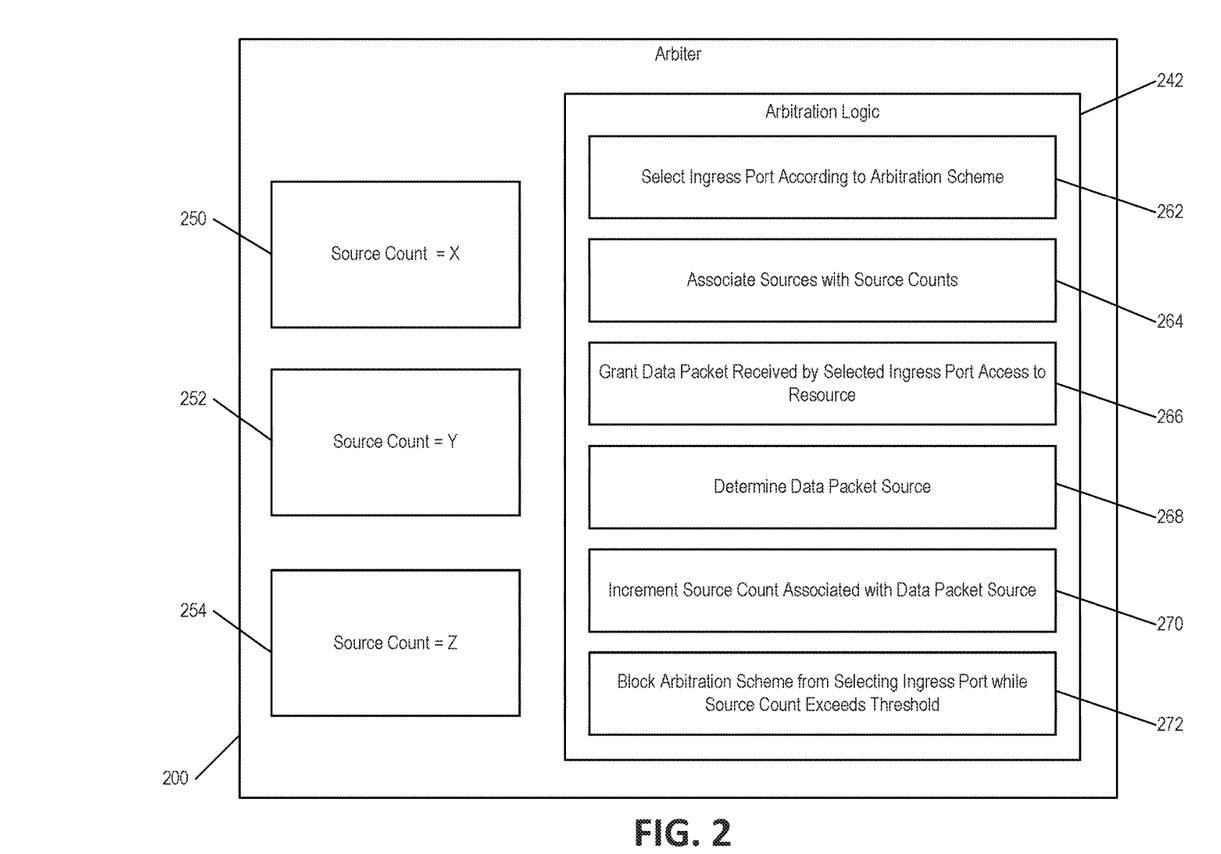
FIG. 2 is a block diagram of an example arbiter for source arbitration.

FIG. 2 is a block diagram of an example arbiter 200 for source arbitration. Arbiter 200 may be an example implementation of arbiter 140 as illustrated in FIG. 1. Arbiter 200 may include arbitration logic 242, which may be an example implementation of arbitration logic 142 of FIG. 1. Arbiter 200 may further include any number of source counts for regulating resource access. A source count may be logical circuitry and/or processing circuitry for tracking a number of packets from any number of sources that have been granted access to a resource. For purposes of illustration, FIG. 2 depicts three example source counts: source count 250, source count 252, and source count 254 respectively. Although source counts 250, 252, and 254 are illustrated separately from arbitration logic 242, any number of the source counts may be included within arbitration logic 242, e.g. as logical circuitry. In other example implementations, any number of source counts may be included in local or remote memory.

Arbitration logic 242 may include logic illustrated, for clarity, in the form of blocks to balance access to a resource by a source node. Specifically, arbitration logic 242 may include block 262 to select an ingress port, e.g. ingress port 132 or ingress port 134, according to an arbitration scheme. Any arbitration scheme to promote fair and efficient access to a resource may be implemented. A turn-based scheme, for example, may select an ingress port by turn. One such example of a turn-based scheme is round-robin arbitration. Round-robin arbitration is a scheme including logic that implements a circular counter to grant requests from traffic classes in a cyclical fashion. A round-robin arbitration scheme will grant access to a predetermined amount of data packets received by a selected ingress port, or will grant access to data packets received by a selected ingress port for a predetermined amount of time, or for a predetermined amount of data, before a next-in-line ingress port is selected.

Another example of a turn-based scheme is Least Recently Used (LRU) arbitration. An LRU arbitration scheme may maintain an ordered list of ingress ports. The arbiter may scan the list by priority, and select an ingress port having both a highest priority and received data to be processed. After selecting an ingress port, the arbiter may lower the priority of the ingress port. The ingress port with the granted request may, for instance, be reprioritized to have a lowest priority among the listed ingress ports. Like round-robin arbitration, LRU arbitration provides fairness such that each ingress port is given its "turn."

In some example implementations, ingress ports may be granted weighted priority such that ingress ports having greater weight may be selected a greater number of times, for greater lengths of time, or for the grant of more data, than an ingress port having a lesser weight. This can be implemented a number of ways. For instance, an ingress port with a greater weight may be lowered in priority after a larger number of data packets are granted access than an ingress port with a lesser weight; an ingress port with a greater weight may not be lowered to as great a degree in priority after being selected as would an ingress port having a lesser weight; etc.

Age-based arbitration is another example arbitration scheme. An age-based arbitration scheme selects an ingress port having a received data packet of an oldest age among received data packets at the network interface. The age of a data packet may be determined by the time since the request was initiated, by the time the request existed in a queue of requests to be granted access by the arbiter at an ingress port, by the number of times a request was not selected among received requests to be granted access to a resource, etc.

Arbiter 200 may include block 264 to associate sources with source counts. In the illustrated example, source count 250, source count 252 and/or source count 254 may be associated with any of source nodes 102-108 of FIG. 1. In an example, each ingress port may include and/or be associated with any number of source counts.

According to block 266, a data packet received by the selected ingress port may be granted access to a shared resource. Block 268 may determine a source of the granted data packet. For example, it may be determined whether the granted data packet was received from source node 102, 104, 106, or 108 of FIG. 1. The source of the data packet may be determined, for example, by a source identifier of the data packet, e.g. source identifier 152, of data packet 150. A source identifier may be a source identification number, a tag, an address, or any other data and/or metadata to identify the source of packet 150. In some example implementations, a one-to-one correlation between source devices and source counts may be provided. In other example implementations multiple source devices may share a source count (e.g. to reduce resource costs).

Once the data packet source is determined, arbitration logic 270 may increment a source count associated with the determined data packet source. For example, source count 250 may be associated with source node 108. When a data packet from source node 108 is granted access to the shared resource, source count 250 may be incremented from X to X+1. More than one source node may be associated with a source count. As another illustrative example, source count 252 may be associated with source nodes 102, 104, and 106. When a data packet from either source node 102, 104, or 106 is granted access to the shared resource, source count 252 may be incremented from Y to Y+1. Accordingly, a source count may track the number of data packets granted from any number of particular source nodes.

Any of source counts 250-254 may exceed a threshold. Arbitration logic 272 may block the selection of an ingress port associated with a source count that exceeds the threshold. For example, source count 250 may exceed a threshold T such that X>T. Source count 250 may be associated with source node 108. In this example, source node 108 may be associated with ingress port 134 because source node 108 transmits data to ingress port 134 as illustrated in FIG. 1. Thus, ingress port 134 is not selected by the arbitration scheme implemented by logic 262 while X>T.

In a turn-based arbitration scheme for example, ingress port 134 may not be selected while X>T, even where ingress port 134 may otherwise be selected according to the turn-based scheme. As another example, an age-based arbitration scheme may be implemented by logic 262, and ingress port 134 may not be selected while X>T even when ingress port 134 has a received data packet of a greatest age among data packets received by network interface 120. Rather, the arbitration scheme may, for instance, skip to a next-in-line ingress port for selection, or select an ingress port that has an oldest data packet among received data packets at an ingress port not blocked by arbitration logic 272.

An ingress port may be associated with multiple source nodes and/or multiple source counts. Referring to the example illustrated in FIG. 1, ingress port 132 may receive a mixed data stream including data received from source node 102, source node 104, and source node 106. Ingress port 132 may thus be associated with source nodes 102-106. In an example, source count 250 may be associated with source node 102, source count 252 may be associated with source node 104, and source count 254 may be associated with source node 106. Thus, ingress port 132 may be blocked from selection if any of the following occurs: source count 250 exceeds a threshold X>T, source count 252 exceeds a threshold Y>T, or source count 254 exceeds a threshold Z>T.

Although one such example of a threshold T is described for purposes of conciseness and clarity, any number of different threshold values may be utilized with each source count. In some example implementations, a source node may be granted a greater weighted priority by associating the source node with a source count having a greater threshold than a source count associated with a source node of lower priority. In another example, source counts may have a like threshold. A greater number of source nodes of lower priority may be associated with a first source count, while a lesser number of source nodes of higher priority may be associated with a second source count. Thus, each source node of lower priority will be served less access grants before exceeding the threshold relative to each source node of higher priority.

Arbitration logic 242 as described above may thus ensure balanced arbitration between source nodes. Where a source node has been granted a threshold amount of access to a shared resource, the source node and/or associated ingress port or queue may not be granted further access until other source nodes are served. As described below, access may resume if there are no other unblocked sources and/or associated ingress ports or queues requesting the shared resource being arbitrated for or after a predetermined lapse of time. Normal arbitrated access may resume and the source counts set to the initial values when each source has been granted a threshold amount of access to the shared resource.

Figure 3:
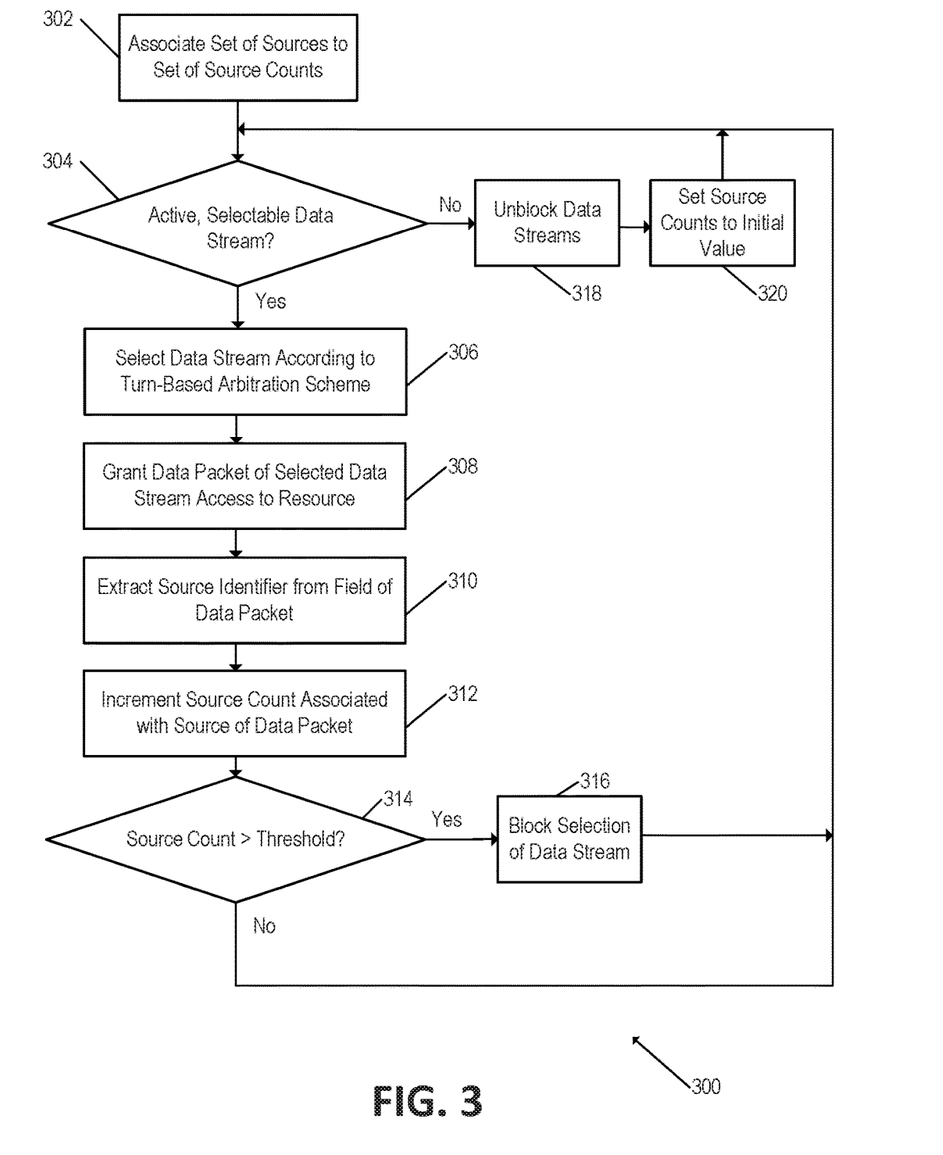
FIG. 3 is a flowchart illustrating an example method of source arbitration.

FIG. 3 is a flowchart illustrating an example method 300 of source arbitration. Although execution of method 300 is described below with reference to system 100 and arbiter 200, other suitable components for execution of method 300 may be utilized. Additionally, the components for executing method 300 may spread among multiple devices. Method 300 may be implemented in the form of executable instructions stored on a machine-readable storage medium and/or in the form of electronic circuitry, e.g. hardware. In some examples, steps of method 300 may be executed substantially concurrently or in a different order than shown in FIG. 3. In some examples, method 300 may include more or less steps than are shown in FIG. 3. In some examples, some of the steps of method 300 may, at certain times, be ongoing and/or may repeat. The steps of method 300 may be implemented by an arbiter, and may be implemented, for example, by arbitration logic 142 of FIG. 1 or arbitration logic 242 of FIG. 2.

At block 302, any number sources of a network may be associated with any number of source counts. A source may be associated with a source count such that grants to packets originating from the associated source are tracked. For example, source count 250, source count 252 and/or source count 254 of FIG. 2 may be associated with any of source nodes 102-108 of FIG. 1. In some example implementations, a source count may be associated with multiple source nodes.

At block 304 it may be determined whether there are any active, selectable data streams of the network, i.e. whether any packets included in a selectable, data stream have been received by a network interface. A data stream may be active where there is a data packet of the data stream in a queue of an ingress ports. A data stream may be selectable where the data stream, queue at which the data stream is received, and/or ingress port at which the data stream is received, is not blocked. Responsive to a positive determination at block 304, an active data stream, i.e. a data stream having a data packet within a queue of an ingress port, may be selected at block 306. The data stream or ingress port may be selected according to a turn-based arbitration scheme, however, other arbitration schemes may be utilized to promote fair and/or efficient arbitration between multiple source nodes.

At block 308, a data packet of the selected data stream, or a data packet received at a selected ingress port, may be granted access to a resource, such as resource 112 of FIG. 1. At block 310, a source of the data packet may be determined. In some example implementations, the source of the data packet may be determined by extracting a source identifier from a field of the data packet—e.g. extracting source identifier 152 from packet 150. A source identifier may be a source identification number, a tag, an address, or any other data and/or metadata to identify the source of the data packet.

At block 312, the source count associated with the determined source of the data packet may be incremented. At block 314, it may be determined whether the source count exceeds a threshold. The data stream, queue, and/or ingress port, associated with the source count may be blocked where the source count exceeds the threshold. A blocked data stream, queue, ingress port, etc., will not be selected by the arbitration scheme at block 306. A negative determination at block 314, or the blocking of a data stream, queue, and/or ingress port, is followed by a return to block 304.

Following this approach, a point will be reached where no active data stream is selectable. This may be due to a lack of contention for the shared resource, a number of blocked data streams, and/or any combination thereof. At block 318, any blocked data stream or blocked ingress port may be unblocked where there is no selectable data stream or selectable ingress port. An unblocked data stream or ingress port may be selectable by the arbitration scheme at block 306, whereas a blocked data stream or ingress port is not selectable by the arbitration scheme. At block 320, the set of source counts may be set to an initial value, followed by a return to block 304. Accordingly, this approach blocks various queues to balance the service of queues by source node.

Figure 4:
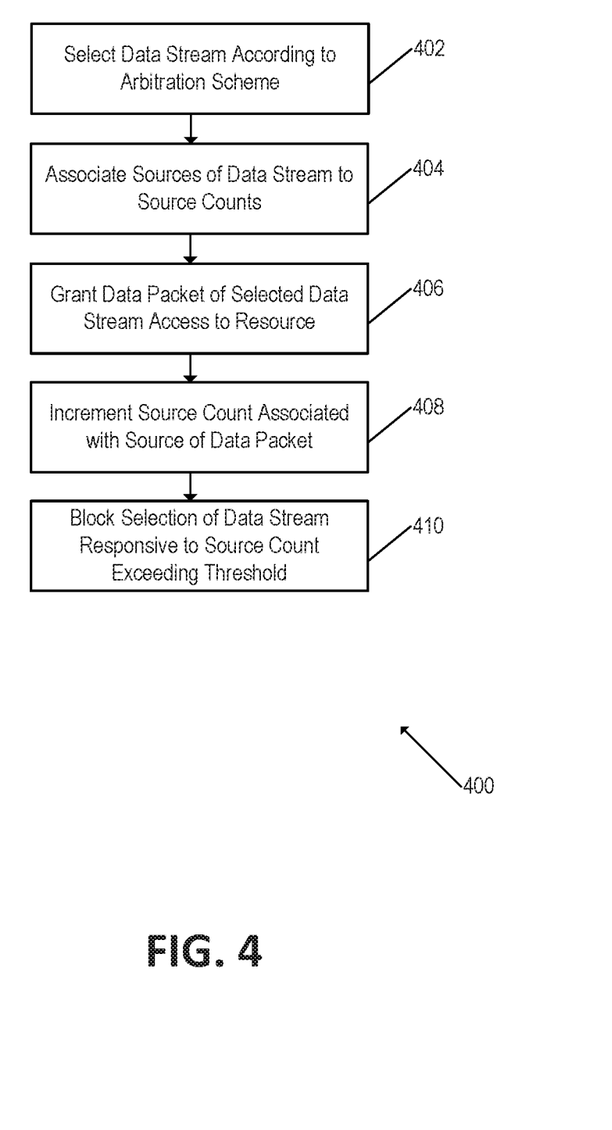
FIG. 4 is a flowchart illustrating another example method of source arbitration.

FIG. 4 is a flowchart illustrating another example method 400 of source arbitration. The components for executing method 400 may spread among multiple devices. Method 400 may be implemented in the form of executable instructions stored on a machine-readable storage medium and/or in the form of electronic circuitry, e.g. hardware. In some examples, steps of method 400 may be executed substantially concurrently or in a different order than shown in FIG. 4. In some examples, method 400 may include more or less steps than are shown in FIG. 4. In some examples, some of the steps of method 400 may, at certain times, be ongoing and/or may repeat. The steps of method 400 may be implemented by an arbiter, and may be implemented, for example, by arbitration logic 142 of FIG. 1 or arbitration logic 242 of FIG. 2.

At block 402, a data stream may be selected. The data stream may be selected according to a turn-based arbitration scheme, however, other arbitration schemes may be utilized to promote fair and/or efficient arbitration between multiple source nodes. At block 404, any number of sources of the data stream may be associated with any number of source counts. A source may be associated with a source count such that grants to packets originating from the associated source are tracked. In some example implementations, a source count may be associated with multiple source nodes.

At block 406, a data packet of the selected data stream may be granted access to a resource. At block 408, the source count associated with the source of the data packet may be adjusted, e.g. incremented. It may be determined whether the source count exceeds a threshold. At block 410, the data stream associated with the source count may be blocked where the source count exceeds the threshold.

Figure 5:
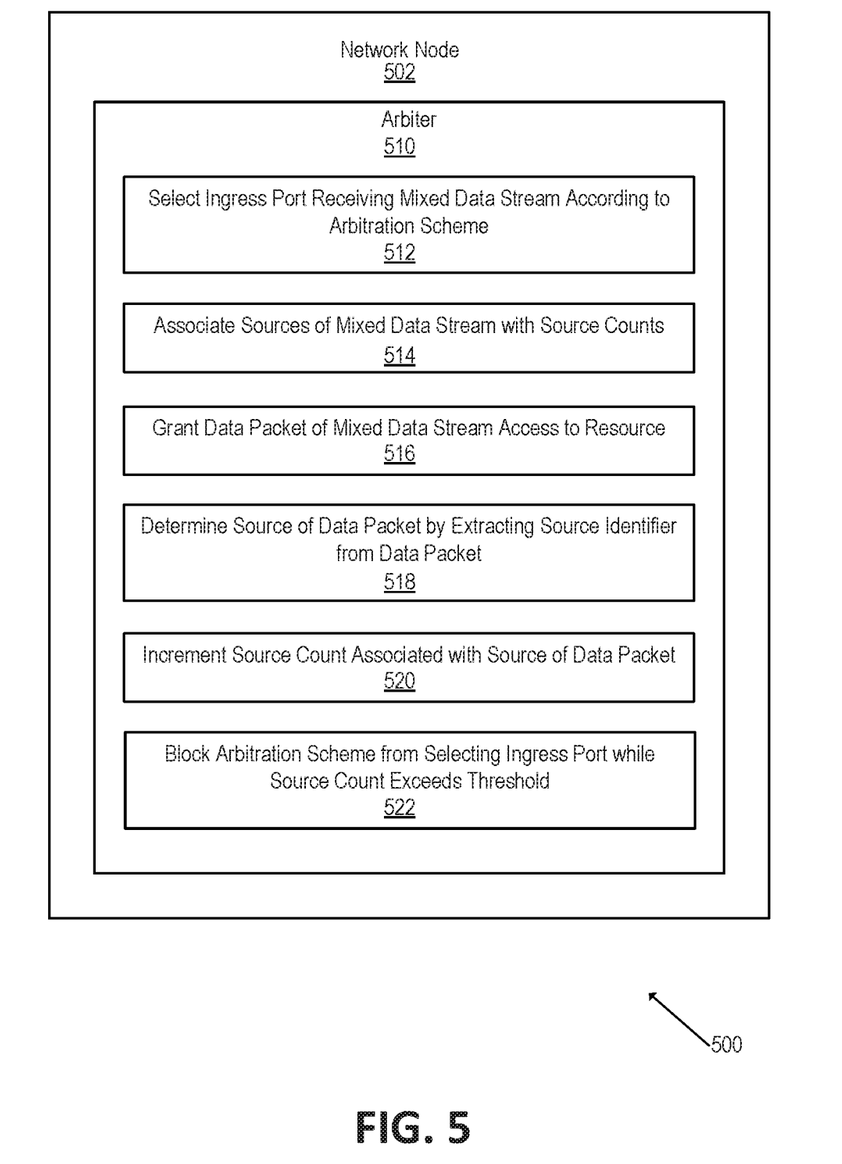
FIG. 5 is a block diagram illustrating an example network node for managing access to a network resource.

FIG. 5 is a block diagram 500 illustrating a network node 502 including an arbiter 510 for managing access to a network resource by source node. Network node 502 may be implemented as hardware or a combination of hardware and software/firmware and may be in communication with other networks nodes over a network fabric. Similarly, arbiter 510 may be implemented as hardware or a combination of hardware and software/firmware. For example, arbiter 510 may be implemented as logical circuitry, processing circuitry (such as central processing units (CPUs), microprocessors, microcontroller devices, digital signal processors (DSPs), etc.) executing machine readable instructions stored in non-transitory machine readable media, application-specific integrated circuits (ASICs), field-programmable gate arrays (FPGAs), application-specific instruction set processors (ASIPs), and/or the like, in any combination of the aforementioned physical structures, some of which may be shared. Furthermore, the logical circuitry and/or processing circuitry of arbiter 510 may be implemented as a single component, or split among multiple components.

Blocks 512-522 illustrate the logic to be executed by arbiter 510. While blocks 512-522 are described below in a particular sequence, blocks 512-522 may be executed substantially concurrently or in a different order than shown in FIG. 5. At block 512, arbiter 510 may select an ingress port according to any of the arbitration schemes described above. An ingress port may receive any number of data streams, and may receive a mixed data stream, i.e. a data stream including packets from multiple sources. Data packets of a data stream may be stored in a queue of the ingress port for processing.

At block 514, any number of sources of the data stream may be associated with any number of source counts. A source may be associated with a source count such that grants to packets originating from the associated source are tracked. In some example implementations, a source count may be associated with multiple source nodes. At block 516, a data packet of a mixed data stream may be granted access to a shared resource. At block 518, a source of the data packet may be determined. In some example implementations, the source of the data packet may be determined by extracting a source identifier from a field of the data packet. A source identifier may be a source identification number, a tag, an address, or any other data and/or metadata to identify the source of the data packet.

At block 520, the source count associated with the source of the data packet may be adjusted. It may be determined whether the source count exceeds a threshold. At block 522, the ingress port associated with the source count may be blocked from selection where the source count exceeds the threshold. In the proceeding example the source count is adjusted by incrementing the source count until the source count reaches a threshold; however, other methods of tracking the granted data packets may be implemented, e.g. decrementing the source count).

Figure 6:
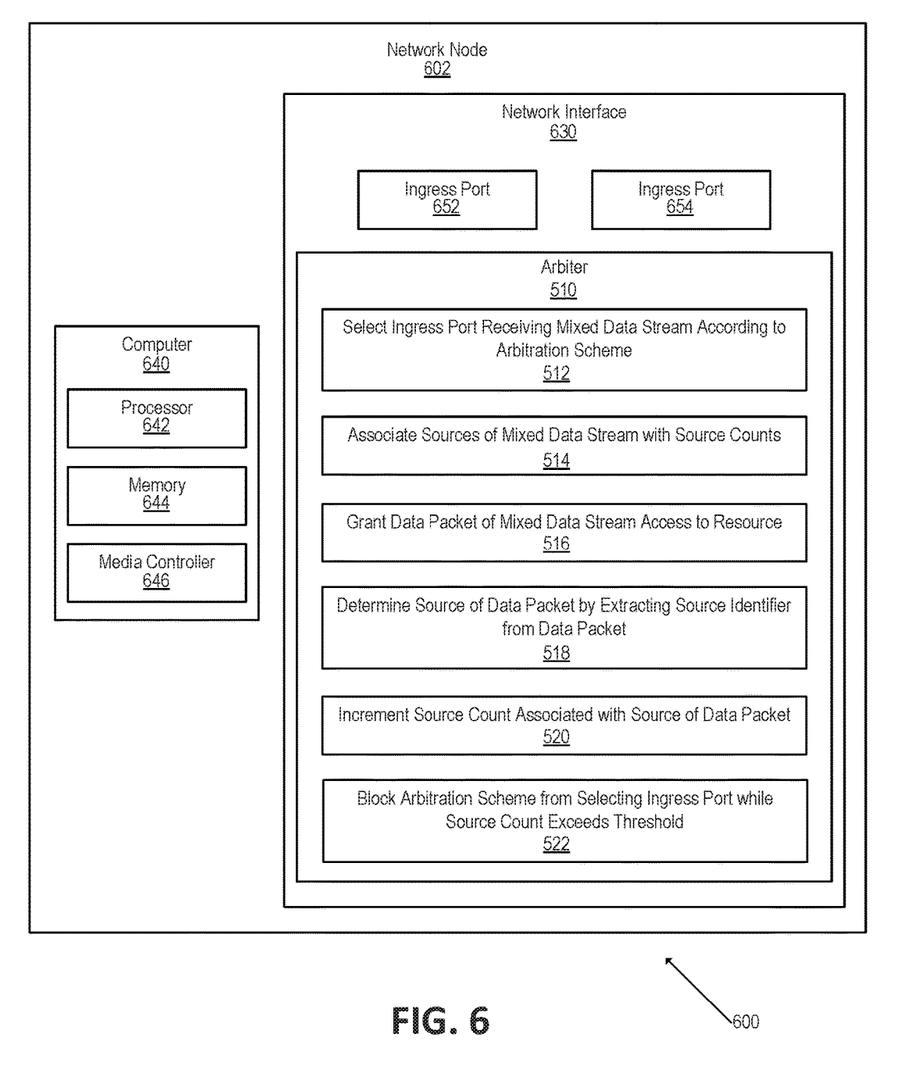
FIG. 6 is a block diagram illustrating an example network node for managing access to a network resource.

FIG. 6 is a block diagram 600 illustrating an example of a network node 602 having an arbiter 510 for managing access to a network resource by source node. Network node 602 may include similar architecture to network node 502 of FIG. 5, including arbiter 510 having blocks 512-522. Blocks 512-522, as detailed above, illustrate logic to be executed by arbiter 510. In this example, arbiter 510 may be included in a network interface 630 of network node 602. Network interface 630 may provide access to a network. For example, data may be transmitted across a network and received at network interface 630, specifically at ingress port 652 and/or ingress port 654.

Network node 602 may further include a computer 640 having a processor 642 and memory 644 coupled to network interface 630. Computer 640 is an electronic system having memory 644 for storing coded instructions, and processor 642 configured to fetch and execute the instructions. As an example, the computer 640 may run an application, and network interface 630 may enable the application to access the network via network interface 630. Computer 640 may also include a media controller 646 coupled to network interface 620 for managing memory 644. Specifically, media controller 646 may communicate data stored in memory 644 over the network via network interface 630, and may answer requests granted by arbiter 510. For instance, data packets received by ingress ports 652 and/or 654 may request access to memory 644. Such requests may be processed by processor 642 and otherwise fulfilled by media controller 646. Media controller 646 may include hardware and/or a combination of hardware and/or software. The rate at which media controller 646 may communicate data over the network may be managed by arbiter 510 according to the logic described in blocks 512-522.

Figure 7:
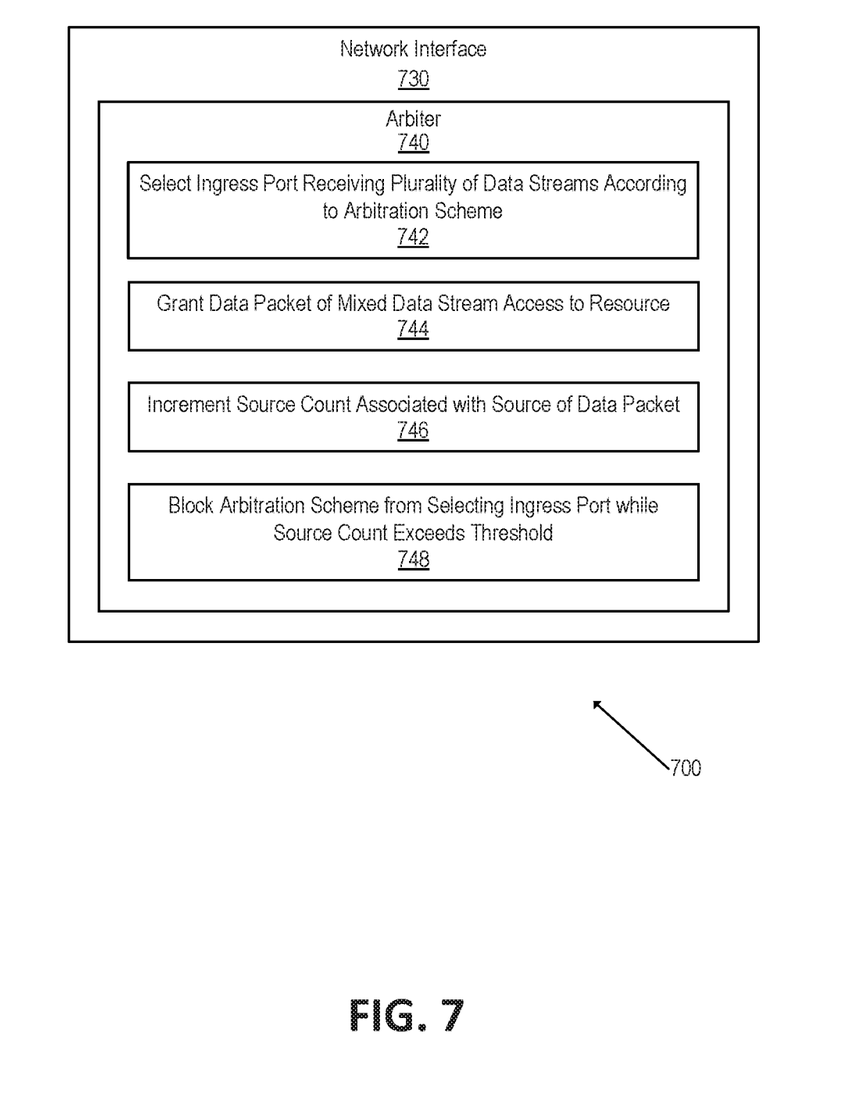
FIG. 7 is a block diagram illustrating an example of a network interface for managing access to a network resource.

FIG. 7 is a block diagram 700 illustrating an example of a network interface 730. Network interface 730 may include similar architecture to network interface 630 of FIG. 6. Arbiter 740 of network interface 730 may include logic 742-748 for managing access to a network resource by source node.

At block 742, arbiter 740 may select an ingress port according to any of the arbitration schemes described above. An ingress port may receive any number of data streams, and may receive a mixed data stream, i.e. a data stream including packets from multiple sources. Data packets of a data stream may be stored in a queue of the ingress port for processing.

At block 744, a data packet of a mixed data stream may be granted access to a shared resource. At block 746, the source count associated with the source of the data packet may be incremented. It may be determined whether the source count exceeds a threshold. At block 748, the ingress port associated with the source count may be blocked from selection where the source count exceeds the threshold. Specifically, the ingress port may be blocked such that the arbitration scheme at block 742 may not select the ingress port while it remains blocked.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

The invention claimed is:

1. A method comprising:
    arbitrating access to a shared resource for a plurality of data streams by,
        selecting a data stream from the plurality of data streams according to an arbitration scheme;
        associating a set of sources of the data stream to a set of source counts;
        granting a data packet of the selected data stream access to the shared resource;
        adjusting a source count of the set of source counts associated with a source of the data packet; and
        blocking the arbitration scheme from selecting the data stream in response to the source count exceeding a threshold.

2. The method of claim 1, further comprising determining the source of the data packet by extracting a source identifier from a field of the data packet.

3. The method of claim 2, wherein the source identifier is a processor core identifier or application program context identifier.

4. The method of claim 1, further comprising unblocking the data stream and setting the source count to an initial value when no data stream of the plurality of data streams is selectable.

5. The method of claim 4, further comprising setting the set of source counts to the initial value when no data stream of the plurality of data streams is selectable.

6. The method of claim 1, further comprising unblocking the data stream and setting the source count to an initial value when there is no contention for access to the shared resource.

7. The method of claim 6, further comprising setting the set of source counts to the initial value when there is no contention for access to the shared resource.

8. The method of claim 1, wherein a plurality of sources of the set of sources is associated with a single source count.

9. A network node comprising:
    an arbiter to:
        select an ingress port of a plurality of ingress ports according to an arbitration scheme, the ingress port to receive a mixed data stream from a set of sources, the mixed data stream to request access to a shared resource;
        associate the set of sources with a set of source counts;
        grant a data packet of the mixed data stream access to the shared resource;
        determine a source of a data packet of the mixed data stream by extracting a source identifier from the data packet;
        increment a source count of the set of source counts associated with the source of the data packet; and
        block the arbitration scheme from selecting the ingress port while the source count exceeds a threshold.

10. The network node of claim 9, further comprising a network interface to access a network, the network interface including the arbiter.

11. The network node of claim 10, further comprising a computer having a processor and memory coupled to the network interface such that an application running on the computer can access the network via the network interface.

12. The network node of claim 10, further comprising a media controller and a memory, the media controller and memory coupled to the network interface such that the media controller can communicate data stored in the memory over the network via the network interface.

13. The network node of claim 9, wherein the arbiter sets the source count to an initial value when no ingress port of the plurality of ingress ports is selectable.

14. The network node of claim 9, wherein the arbiter sets the source count to an initial value when there is no contention for access to the shared resource.

15. A network interface comprising:
    a plurality of ingress ports, the ingress ports to receive, over the network fabric, a plurality of data streams from a set of sources; and
    an arbiter to:
        select an ingress port of the plurality of ingress ports according to an arbitration scheme;
        grant a data packet of a data stream received from the selected ingress port access to a shared resource;
        increment a source count associated with a source of the data packet; and
        block the arbitration scheme from selecting the ingress port in response to the source count exceeding a threshold.

16. The network interface of claim 15, wherein the arbitration scheme is a turn-based arbitration scheme.

17. The network interface of claim 15, wherein a plurality of sources of the set of sources is associated with a single source count.

18. The network interface of claim 15, further comprising the arbiter to determine the source of the data packet by extracting a source identifier from a field of the data packet.

19. The network interface of claim 15, further comprising the arbiter to unblock the data stream and set the source count to an initial value when no data stream of the plurality of data streams is selectable.

20. The network interface of claim 15, further comprising the arbiter to unblock the data stream and set the source count to an initial value when there is no contention for access to the shared resource.

* * * * *